United States Patent [19]

Taylor

[11] Patent Number: 5,572,119
[45] Date of Patent: Nov. 5, 1996

[54] EDDY CURRENT POSITION SENSOR INCLUDING AN INSULATING BASE HAVING CONDUCTIVE SURFACES FOR ELECTRICALLY CONNECTING A COIL TO THE LEAD WIRES

[75] Inventor: Howard E. Taylor, Bradenton, Fla.

[73] Assignee: Barber-Colman Company, Loves Park, Ill.

[21] Appl. No.: 332,850

[22] Filed: Oct. 31, 1994

Related U.S. Application Data

[63] Continuation-in-part of Ser. No. 331,058, Oct. 28, 1994, abandoned.

[51] Int. Cl.$^6$ .............................. G01B 7/14; G01B 7/30
[52] U.S. Cl. .............................. 324/207.16; 324/207.25; 324/260; 174/261
[58] Field of Search .................. 324/207.11–207.15, 324/207.16, 207.24, 207.25, 207.26, 260, 262, 164, 166, 173, 174; 439/77, 493, 620; 403/272; 174/255, 256, 261

[56] References Cited

U.S. PATENT DOCUMENTS

| | | | |
|---|---|---|---|
| 3,541,394 | 11/1970 | Brenneman et al. | 324/207.16 |
| 3,745,509 | 7/1973 | Woodward et al. | 439/493 |
| 4,114,960 | 9/1978 | Habermann et al. | 310/90.5 |
| 4,157,612 | 6/1979 | Rainal | 439/493 |
| 4,473,259 | 9/1984 | Goldowsky | 310/90.5 |
| 4,563,643 | 1/1986 | Leschek et al. | 324/207.16 |
| 4,639,054 | 1/1987 | Kersbergen | 439/493 |
| 4,931,728 | 6/1990 | Hata et al. | 324/207.25 |
| 5,036,236 | 7/1991 | Wilson | 310/90.5 |
| 5,363,033 | 11/1994 | Suda et al. | 324/207.25 |

FOREIGN PATENT DOCUMENTS

| | | |
|---|---|---|
| 0385575 | 1/1990 | European Pat. Off. . |
| 1001082 | 8/1961 | United Kingdom . |
| 2225855 | 11/1988 | United Kingdom . |

Primary Examiner—Sandra L. O'Shea
Assistant Examiner—Jay M. Patidar

[57] ABSTRACT

A position sensor includes a coil of small diameter litz wire wound around a ferrite rod. The rod is secured in the end of a ceramic support and an end cap is secured on the other end of the rod to form a bobbin section on which the coil is wound. Two palladium silver strips are formed axially along the length of the support extending from the bobbin section to near the base of the support. Two free ends of the coil are formed into strain relief loops and soldered to the strips. Lead wires of comparatively larger diameter are also soldered to the strips but near the base of the support. The strips establish electrical continuity between the coil and the lead wires while separating the end portions of the coil from the lead wires so as to prevent the lead wires from inducing stress into the relatively fragile coil wires. The lead wires are threaded through a cylindrical metal housing, and the base of the ceramic support is located into a cylindrical recess in the housing to support and seal the working end of the sensor.

16 Claims, 2 Drawing Sheets

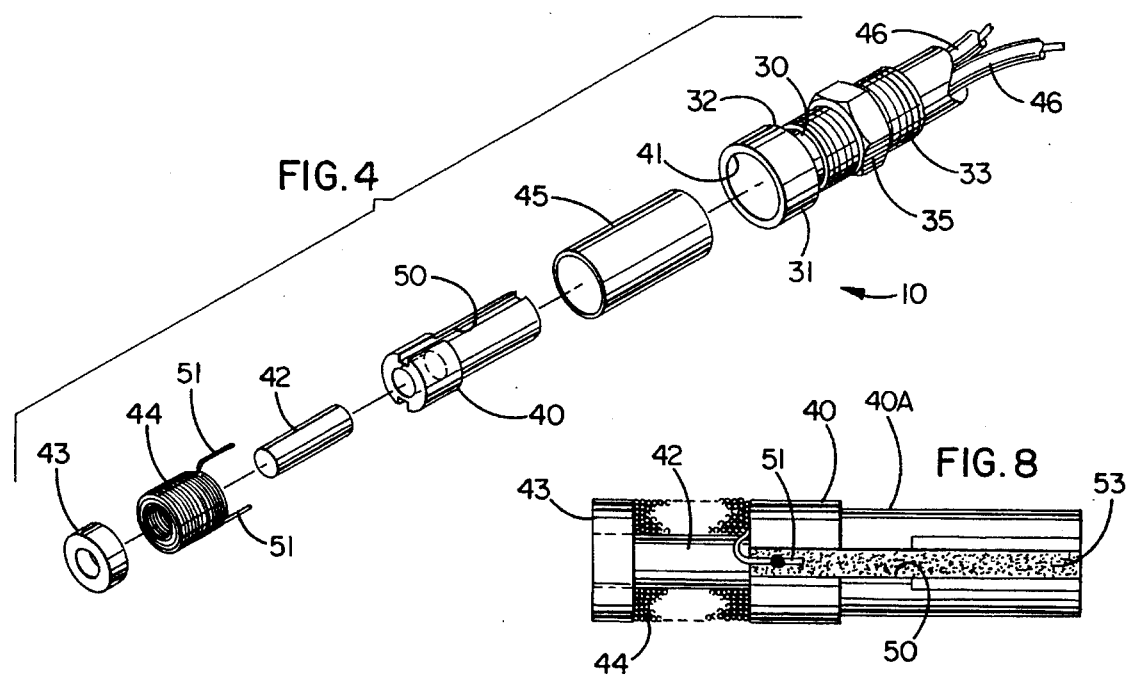
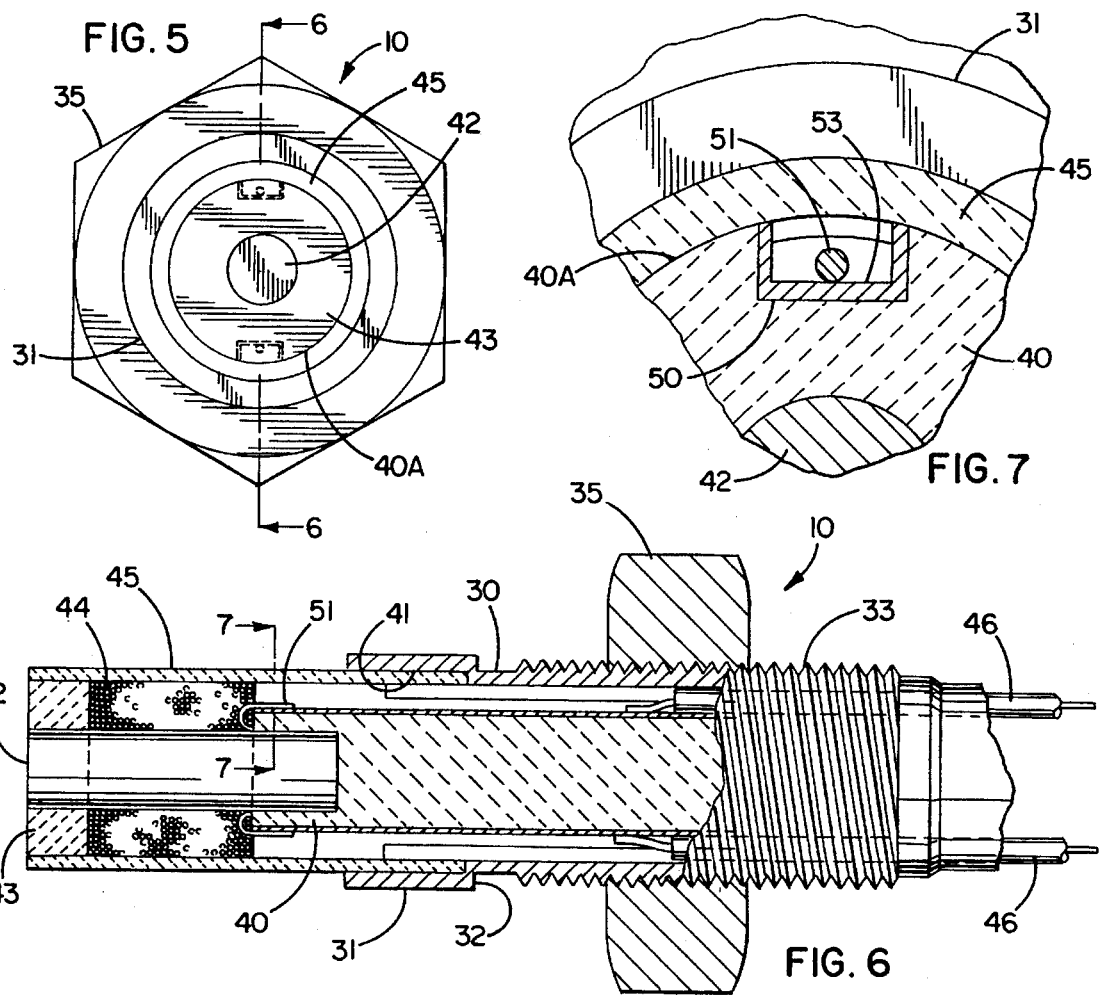

EDDY CURRENT POSITION SENSOR INCLUDING AN INSULATING BASE HAVING CONDUCTIVE SURFACES FOR ELECTRICALLY CONNECTING A COIL TO THE LEAD WIRES

CROSS-REFERENCE TO A RELATED APPLICATION

This application is a continuation-in-part of my application Ser. No. 08/331,058, filed Oct. 28, 1994 now abandoned (our Case No. 63231) entitled Position Sensor.

BACKGROUND OF THE INVENTION

This invention relates to magnetic bearings, and more particularly to position sensors of the type adapted to measure the position of a shaft rotatably supported in a housing with an accuracy of a few ten-thousandths of an inch.

As is well known, active magnetic bearings provide contact-free support of a rotating shaft by positioning an array of electromagnets about the shaft and controlling the current in the coils of the electromagnets to levitate the shaft at a position more or less centered within the array of electromagnets. Shaft position sensors, preferably also of the non-contact variety, are required to sense the position of the shaft and provide shaft position signals to a controller which regulates the current in the coils to achieve the desired shaft position. Typically, each radial bearing requires two position sensors. Active magnetic axial or thrust bearings, often used in conjunction with magnetic radial bearings, require an additional sensor. Thus, a machine with two sets of radial magnetic bearings and an axial magnetic bearing will require five shaft position sensors, all positionally associated in reasonable proximity to the electromagnets which they control.

Active magnetic bearings can be used in a variety of applications, and the air cycle machine is used as an example herein to demonstrate the rather severe constraints which are put on the components in general, and on the shaft position sensors in particular.

Air cycle machines are used on aircraft to cool and condition bleed air supplied by a gas turbine engine such as the main engine of the aircraft or an auxiliary power unit.

In an air cycle machine, one end of the rotatable shaft is connected to a turbine while the other end is connected to a load which is typically a compressor. The bleed air passes first to the compressor where it is further compressed, and heated as a result of the additional compression. After being cooled by a heat exchanger, the compressed air is expanded in the turbine and, as a result, is chilled to a very low temperature for use by the environmental control system of the aircraft to cool the aircraft cabin and avionics. The compressed air acting on the turbine rotates the shaft which, in turn, drives the compressor.

To support the shaft, an air cycle machine typically employs three bearings. Two of the bearings are radial bearings which support the shaft and the elements carried by the shaft. The third bearing is a thrust bearing which holds the shaft in a fixed axial position. For optimum performance, very small clearances must be maintained between the machine housing and the tips of the compressor and turbine blades. If the bearings permit more than just slight amounts of free play, the shaft will shift when loaded and will allow the blade tips to contact the encircling housing. With air cycle machines operating at speeds typically approaching and at times in excess of 100,000 RPM, successful operation of the air cycle machine requires relatively robust bearings capable of precisely maintaining the position of the shaft and having a relatively long service life.

Electronically controlled and electrically energized magnetic bearings are well-suited for use in an air cycle machine since they are non-contact type bearings and have a potentially long service life. In radial magnetic bearings, several electromagnets are angularly spaced around the shaft and, when energized, produce attractive magnetic forces which cause the shaft to levitate in free space and within the housing. A closed-loop electronic controller adjusts the current supplied to each electromagnet so as to change the strength of the magnetic forces in varying directions and in response to external forces acting on the shaft. Position sensors provide the necessary shaft position feedback information to the controller. Specifically, position sensors provide the controller with the radial position of the shaft in two orthogonal directions at locations near each of the radial bearings.

Eddy current position sensors are especially well suited for use with magnetic bearings. Small, precision eddy current sensors having a linear operating range of, for example, ±0,010' can be manufactured having a resolution of ±0.0005' for the precise control needed in a magnetic bearing application and will fit within a relatively small enclosure as might be encountered in an air cycle machine. Eddy current position sensors are non-contact type sensors and do not interfere with the operation of, for example, a high speed rotating shaft. Additionally, eddy current position sensors have no moving parts to wear out and potentially have a long service life, as do magnetic bearings.

During normal operation of an eddy current position sensor, a coil of electrically conductive wire located near the end of the sensor and adjacent the target, e.g., the shaft of the air cycle machine, provides the inductance portion of an LC circuit. The capacitance portion of the circuit is located in the sensor driver or controller. The controller drives the LC circuit at a relatively high resonant frequency to establish an oscillating electromagnetic field around the free end of the sensor, and monitors the voltage across the coil to determine the distance between the target and the sensor, the voltage being generally linearly related to the distance between the target and the sensor so long as the target is within the operating range of the sensor.

The accuracy, linearity, and overall performance of the sensor is related to the quality of the electromagnetic field. Generally, the quality of the field increases as the power losses in the coil decrease, for a given current supplied to the coil. Losses in the coil are due primarily to the resistance of the wire and to self-induced eddy currents in the wire, and to the skin effect. The resistance of a specific coil is related to the desired or required field strength of that coil. The AC losses, i.e., those due to self-induced eddy currents and the skin effect, however, can be reduced by decreasing the diameter of the individual wires which make up the coil. Litz wire, i.e., very fine wire carefully braided together, is well adapted to minimize AC losses, but is rather fragile.

Eddy current position sensors are not subject to mechanical wear, they are, however, subject to mechanical failure. Typically, the coil in a sensor is wound with relatively small diameter wire to minimize the self-induced eddy current losses. A wire of this size is relatively fragile and must be handled carefully. Mechanically stressing this small wire is carefully avoided during the winding of the coil and the manufacturing of the sensor. On the other hand, lead wires from the sensor to the controller must be relatively large and more robust so that the wires do not break during the course of normal handling and anticipated mishandling of the machine in which the sensor is mounted. To establish electrical continuity between the coil and the lead wires, the end portions of the coil and the lead wires are typically soldered together. As a result of the difference in size between the end portions of the coil and the lead wires, the substantially larger lead wires can induce mechanical and thermal stress into the fragile coil end portions, causing the end portions of the coil to break near the solder joint.

Prior sensors, as well as other small electromagnetic devices having a coil wound from relatively small diameter wire and having relatively large diameter lead wires connected to the coil utilize several techniques to minimize the stress on the small wire. For example, some prior sensors locate the solder joints in a small space below the coil and then tape or otherwise secure the joint into this space. Additionally, the solder joints in a prior sensor may be secured by filling the open space in the sensor with either a hard epoxy-based or a pliable silicone-based moldable compound. Despite these efforts to minimize the effect of joining the large wires with the small wires, breaking of the small wire due to stress near the solder joint remains one of, if not the primary source of mechanical failure in prior sensors.

The potential for failure of the small diameter wire is substantially increased when the sensor is used in a high temperature, high vibration environment such as might be encountered in an air cycle machine. A shaft rotating near 100,000 RPM can result in substantial vibration induced stress in the small diameter wire. The temperature of the bleed air in the compressor side of the air cycle machine can approach 500° Fahrenheit. The temperature of the air exiting the turbine side of the air cycle machine can approach −10° Fahrenheit. During start up of the air cycle machine, these operating temperatures are quickly achieved and the small diameter wire may experience substantial thermal shock or thermally induced stress near the solder joint. As a result, despite the position feedback accuracy that can be achieved with the use of eddy current sensors, prior sensors would have an extremely limited service life in an air cycle machine.

SUMMARY OF THE INVENTION

The general aim of the present invention is to provide a new and improved position sensor having enhanced reliability as compared with prior sensors for use as elements of magnetic bearing structures.

A related objective is to provide such a position sensor which is suitable for use in a relatively high temperature, high vibration environment to which magnetic bearings are often subjected.

A detailed object of the invention is to provide a shaft position sensor for a magnetic bearing which has improved reliability and particularly improved wire termination and connection reliability. It is a feature of the invention to separate and mechanically isolate relatively small diameter end portions of an electrical coil from relatively large sensor lead wires while establishing electrical continuity between the lead wires and the coil. As a result, the large diameter wire is prevented from inducing stress into the small diameter wire so as to preclude a primary source of failure in the sensor.

These and other objects and advantages of the invention will become more apparent from the following detailed description when taken in conjunction with the accompanying drawings.

BRIEF DESCRIPTION OF THE DRAWINGS

FIG. 4 is an exploded perspective view of the sensor.

FIG. 5 is an end view of the sensor as seen along the line 5—5 of FIG. 3.

FIG. 6 is an enlarged cross-sectional view taken substantially along the line 6—6 of FIG. 5.

FIG. 7 is a is an enlarged fragmentary cross-sectional view taken substantially along the line 7—7 of FIG. 6.

FIG. 8 is a view similar to FIG. 3 of a partly assembled sensor with the base position removed.

Figure 1:
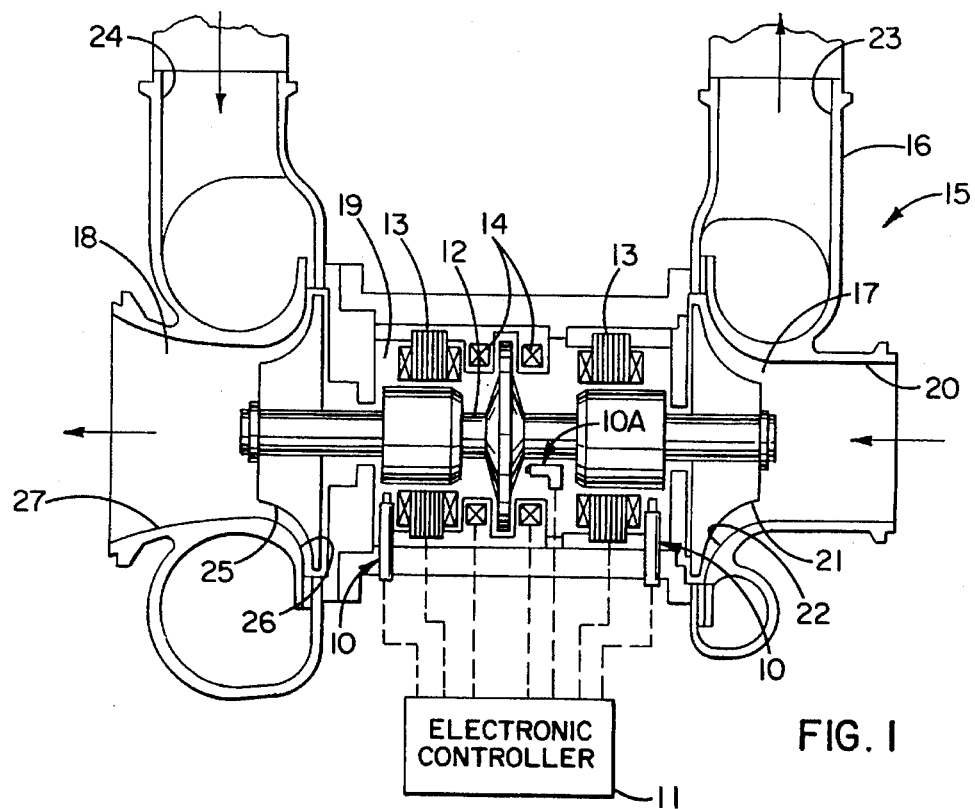
FIG. 1 is a diagrammatic view showing the major components of an air cycle machine and depicting the general location of new and improved position sensors incorporating the unique features of the present invention.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the present invention is shown in the drawings as embodied in eddy current position sensors 10 and 10A (FIG. 1) which, when used in conjunction with a suitable electronic driver or controller 11, are operable to indicate the distance between the free end of each sensor and an object such as a shaft 12 located within an electromagnetic field extending from the free end of that sensor. The sensors 10 and 10A are especially suitable for use as position feedback components in a control circuit for magnetic bearings 13 and 14, respectively, which rotatably support the shaft of an air cycle machine 15.

Briefly, the air cycle machine 15 receives hot pressurized bleed air from a gas turbine engine (not shown) on an aircraft and discharges chilled air into the environmental control system of the aircraft. The air cycle machine includes a housing 16, the shaft 12 located in the housing and rotatably supported by the magnetic bearings 13 and 14, a compressor section 17 at one end of the housing and a turbine section 18 at the opposite end of the housing. The magnetic bearings are located in a center section 19 between the turbine and compressor sections. The compressor section includes an inlet 20 for admitting bleed air, a bladed rotor 21 secured to one end portion of the shaft and rotatable within a stator 22 for compressing the bleed air, and an outlet 23 for discharging the compressed air. The turbine section includes an inlet 24 communicating with the outlet of the compressor for receiving the compressed air, a bladed rotor 25 secured to the opposite end portion of the shaft and rotatable within a stator 26 for expanding the compressed air, and an outlet 27 for discharging the expanded and chilled air to the environmental control system.

Radial magnetic bearings 13 are axially spaced in the center section 19 of the air cycle machine 15 and serve to support the shaft 12 radially within the housing 16. A thrust bearing 14 is located between the two radial bearings and maintains the shaft in a predetermined axial position in the housing. Reference is made to U. S. Pat. No. 5,310,311 for a more detailed disclosure of magnetic bearings of the type adapted for use in an air cycle machine.

Figure 2:
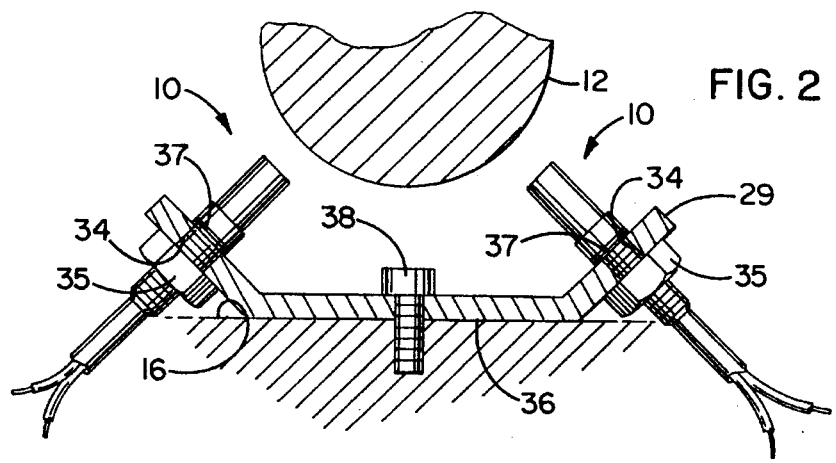
FIG. 2 is a side view of two sensors as installed in the air cycle machine with certain parts shown in cross-section.

Generally, the electronic controller 11 supplies current to the magnetic bearings 13 and 14 and varies the magnitude of that current so as to maintain the shaft 12 radially and axially positioned in the housing. The controller operates closed-loop with the non-contacting eddy current position sensors 10 and 10A, typically driving the sensors at 500 to 1000 Kilohertz, the sensors supplying the controller with shaft position feedback signals. Typically, two sensors 10 are angularly spaced around the shaft (FIG. 2) and are secured to a mounting bracket 29 near each of the radial bearings 13 to provide the controller with information regarding the radial position of the shaft near each of its ends. A single sensor 10A is associated with the thrust bearing 14 for indicating the axial position of the shaft. The sensors 10 and 10A are similar in construction, thus only one of the sensors 10 associated with the radial bearings need be described in detail.

Figure 3:
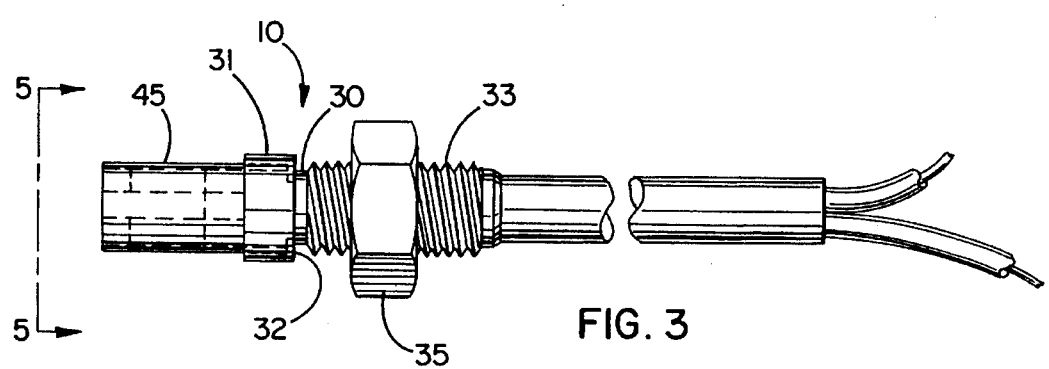
FIG. 3 is an enlarged side view of a sensor.

The fully assembled position sensor 10, as shown in FIG. 3, includes a corrosion resistant housing 30 having a collar 31 with a shoulder 32 and having a threaded portion 33 extending from the collar and being slidably received in an opening 34 in the bracket 29. A nut 35 threaded onto the portion 33 draws the shoulder into engagement with the bracket so as to secure the sensor to the bracket and to aim to sensor toward the shaft 12. The sensor is calibrated for a predetermined shaft diameter located at a predetermined distance from the backside 36 (FIG. 2) of the bracket prior to installation of the sensor into the air cycle machine 15. Shims 37 are positioned between the bracket and the shoulder and are selected to be of the appropriate thickness to achieve the calibrated output from the sensor when the shaft is fixtured as described. The bracket, including both radial sensors, is then secured in the housing 16 with at least one threaded fastener 38 so that the sensing end of the position sensor, i.e., the end of the sensor having the magnetically operative elements, is positioned adjacent and relatively close to the shaft.

The magnetically operative elements of the sensor 10, i.e., those elements extending from the housing 30 and operable to generate the oscillating electromagnetic field, are assembled as can best be appreciated from a comparison of the exploded view of FIG. 4 and the partial view of FIG. 8. A cylindrical ferrite rod 42 is mounted for support in a circular aperture formed in the free end of a generally cylindrical holder or support member 40. The ferrite rod 42 is of highly magnetically permeable material, and the free end of the rod will serve as the element for magnetic coupling with the shaft whose position is to be sensed. The support 40 is of ceramic material, adequate to serve as a support for the ferrite rod and the other electromagnetic elements, but without interfering with either electrical conductivity or magnetic flux lines. The ferrite rod 42 is preferably secured in the aperture in the support 40 by means of a high temperature ceramic-based adhesive. An end cap 43, also of ceramic material, is fixed to the free end of the ferrite rod 42, and is also attached by ceramic-based adhesive. The comparatively larger cylindrical portions of the end cap 43 and the support 40 define a reduced diameter bobbin section between them, comprising the outer periphery of the ferrite core. A coil 44 is wound on the bobbin section directly on the ferrite core.

The overall strength of the electromagnetic field generated by the sensor 10 is equal to the sum of the contributions of the ferrite rod 42 and the coil 44. In practicing the preferred embodiment, the material of the rod and the configuration of the coil are selected so as to minimize the change in the quality or the strength of the electromagnetic field, and therefore, to minimize the change in the output signal of the sensor 10, as the temperature of the sensor changes. As is known, for a sensor having a given coil, the quality of the field generated by the sensor is proportionally related to the permeability of the rod. Additionally, for a sensor having a given rod material and operating at a constant coil or field frequency, the quality of the field generated by the sensor is inversely proportional to the resistance of the coil. Specifically, the quality of the field generated by the coil is proportional to the angularly frequency of the driven coil times the inductance of the coil divided by the resistance of the coil. In other words, the change in the quality or strength of the field due to a change in temperature of the wire is related to the losses in the wire and is inversely and linearly related to the change in restivity of the copper wire (0.0039 ohms per ohm per degree centigrade) in the coil.

To minimize the change in the overall quality of the field, so that the overall quality and strength of the electromagnetic field developed by the sensor 10 remains relatively constant over the wide operating temperature range of the air cycle machine, the increase in the quality of the field due to the increase in permeability of the ferrite rod 42 for a given increase in temperature is matched to the decrease in the quality of the field due to the increase in the restivity of the copper wire for the same increase in temperature. In other words, the quality of the field is maintained constant over a changing operating temperature by "matching" the negative restivity slope of quality verses temperature of the coil 44 with the positive permeability slope of quality verses temperature of the rod. When the two slopes are vectorially added or summed, the overall result is that the quality of the sensor is relatively constant with changing temperature.

Accordingly, a ferrite material 6B1 from Philip Components, Saugerties, N.Y., having a linearly changing and increasing permeability characteristic (approximately 1.5 μ per degree centigrade) over the −50° Fahrenheit to 500° Fahrenheit operating range of the air cycle machine is utilized in the preferred embodiment of the rod 42 so that the quality and strength of the field increase linearly in the position sensor 10 as the temperature of the sensor increases.

In further carrying out the preferred embodiment, the coil 44 is configured to minimize AC resistance by the use of litz wire and so that the negative restivity slope is cancelled by the positive permeability slope of the rod 42. Specifically, the litz wire used in the coil is formed of four strands of 40 AWG copper wire, having an insulating varnish on the exterior thereof, and braided in a manner which achieves on the order to 500 twists in about 60 inches of wire. The coil is preferably made up of about 75 turns of such litz wire wound directly on the ferrite rod. With this arrangement, the negative quality slope of the perferred coil is equal and opposite to the positive quality slope of the rod. Advantageously, for reasons set forth subsequently, the maximum outside diameter of the coil is slightly less than the outside diameter of the end cap 43.

The cylindrical support 40, in addition to providing a cylindrical portion which serves as an end wall of the bobbin, also provides a pair of electrical conductors which run from the bobbin end to the base end of the support 40. The conductors, i.e., conductive surfaces, are preferably recessed to a level of the support which is of lesser diameter than the cylindrical portion 40A. Conveniently, that is accomplished by forming the support with a pair of longitudinal grooves 50 (see also FIGS. 6 and 7) and treating the grooves to render them electrically conductive, and capable of supporting terminated ends of the coil 44 and the sensor lead wires 46. Conductive strips 53 of a eutectic bonded conductive material, preferably of palladium silver, are then formed in the grooves. Commercially available palladium silver paste is applied in the grooves so as to form two strips extending along the length of the support from the bobbin end to the base end. In the illustrated embodiment, the strips are formed on diametrically opposed sides of the support for convenience, although they can be otherwise placed if desired. Having applied the palladium silver paste to the grooves, the support is heated in an oven to approximately 1600° Fahrenheit, whereupon the electrically conductive palladium silver paste bonds with the ceramic material, leaving a thin coating of palladium silver on the surface of the grooves (see FIG. 7).

Having wound the coil 44 on the bobbin section of a partly assembled sensor, the two free ends of the coil are then affixed to the conductive strips 53 near the bobbin end of the support 40 In practicing the invention, a strain relief loop is formed in each end portion 51 of the wire terminating the coil, and that end portion is then soldered to an associated one of the strips 53. One lead is soldered to each strip. Similarly, lead wires 46, preferably 18–20 AWG copper wire, are soldered to the opposite or base end of the palladium silver strips, one lead being soldered to each strip. The lead wires are soldered in such a fashion that they are not in physical contact with the coil leads, but make electrical contact by means of the conductive palladium silver strips. Due to the relatively high temperature environment of the air cycle machine 15, a high temperature silver solder having a melting point of approximately 490° Fahrenheit is used to solder the wires to the strips.

In order to protect the electrical leads and their connections, and to limit the forces which can be applied to the comparatively fragile ferrite rod 42, a tubular ceramic sleeve or casing 45 is secured around the support member 40 so that it completely covers not only the support but also the coil 44 and the end cap 43. The inside of the casing is sized to fit snugly around the outside of the end cap. As a result, there is a relatively small gap, e.g., 0 010" between the outside diameter of the coil and the inside diameter of the casing. The sleeve is located so that one end of the sleeve is flush with the outer surface of the end cap 43. High temperature ceramic-based adhesive applied at appropriate points between the casing and the end cap is used to completely seal that end of the sensor. The wire leads 46 which project from the bottom of the partly completed device are then threaded through the metallic housing 30 until the base of the sleeve member 45 comes into contact with the base of the annular opening 41 at the end of the housing 30. The end of the sleeve 45 fits closely into the opening 41, and it is affixed therein with ceramic-based adhesive. The same adhesive is also used preferably to seal the lower portion of the housing 30 around the lead wires 46. When completed, the device takes the appearance illustrated in greater detail in FIG. 6. Preferably, the outside diameter of the casing is less than 0.25", and the length of the sleeve and housing needed to protect the coil and the solder connections is less than 1.0" so that the sensor fits within the relatively small enclosure as might be encountered in an air cycle machine. The housing of the sensor 10A is similar to the housing 30, except that the support and the lead wires extend from the housing of the sensor 10A at right angles relative to one another. That is achieved by forming the base of the housing in the desired right angle configuration, and threading the wires 46 through the right angle portion before securing the ceramic sleeve in the mating recess in the housing.

In the preferred embodiment, the inside of the sensor 10 is not filled or "potted" and except for the high-temperature adhesive that bonds the components of the sensor together and seals the inside of the sensor from the outside environment, the spaces between the internal components remain unfilled. Particularly, the coil 44 is not impregnated or potted and the space between the outside diameter of the coil and the inside diameter of the casing 45, and the recesses 50 are not potted. The small spaces between the coiled litz wire, the space between the outside of the coil and the inside of the casing 45, and the space around the strain relief loops, permit the wire to freely expand and contract upon changing temperatures without being hindered by a compound having a different coefficient of expansion. As a result, thermal cycles experienced during the normal operation of the sensor 10 will not unduly stress the fragile coil wire.

With the foregoing arrangement, the sensor 10 is positioned so as to be operable to provide a position signal to the controller 11. The basic operation of the eddy current sensor is well known. Briefly, with regard to the air cycle machine 15, the coil 44 provides the inductance portion of an LC circuit, the capacitance portion of the circuit being located in the controller. During normal operation, the controller supplies a predetermined current to the LC circuit and drives the circuit at a relatively high frequency to establish an oscillating resonant electromagnetic field around the free end of the sensor. The ferrite rod 42 helps to concentrate or focus the electromagnetic field. Preferably, the ceramic tube 45 is sufficiently long so that the free end of the support 40 extends beyond the collar 31. As a result, the coil 44 is located completely outside of the housing so as to permit full development of the electromagnetic field without interference from the metallic housing. The extremely fine coil wire substantially reduces the self-induced eddy current losses in the coil and enhances the quality of the electromagnetic field as compared with prior sensors used in conjunction with magnetic bearings 13 and 14.

If the shaft 12 were not located within the electromagnetic field of the sensor 10, the amplitude of the voltage across coil 44 will be a maximum value as established by the current flow and the losses in the coil. The operating range of the sensor, however, is preferably such that the shaft is within the electromagnetic field throughout the entire range of radial shaft movement. As a result, eddy currents induced in the shaft by the oscillating electromagnetic field result in a power loss from the field. As the shaft moves toward the sensor, the reduction in voltage across the sensor coil is proportional to the power loss in the field and the power loss is generally proportional to the change in position of the shaft relative to the free end of the sensor.

The voltage across the coil 44 is a known function of the distance between the shaft 12 and the free end of the sensor 10 since the sensor is calibrated prior to installation into the air cycle machine 15. During normal operation of the air cycle machine, the controller 11 continuously monitors this voltage to determine the precise location of the shaft in the housing 16. The controller then compares the actual position of the shaft with the desired position of the shaft and adjusts the current to angularly spaced electromagnets of the radial magnetic bearings 13 so as to maintain the shaft within a tolerance zone of a predetermined axis of rotation. In a similar manner, the controller adjusts the current to the axially spaced electromagnets of the thrust bearing 14 so as to maintain the shaft in a predetermined axial position in the housing.

The sensor 10 is subjected to a severe operating environment in the air cycle machine 15. The temperature of the air in the compressor 17 can approach 500° Fahrenheit. As a result, the radial sensors on the compressor side of the air cycle machine may experience an ambient temperature approaching 400° Fahrenheit. Advantageously, the support 40, the end cap 43, and the casing 45 are made from ceramic material such as "MACOR" having a relatively low coefficient of thermal expansion to minimize the error in the sensor output signal resulting from linear growth of the sensor toward the shaft 12. These parts are secured in the sensor with a high temperature ceramic-based adhesive. Additionally, all openings or spaces around the casing and at the exit of the lead wires 46 are sealed with the high temperature adhesive to protect the interior of the sensor from moisture and other contaminants in the environment of the air cycle machine.

With the foregoing arrangement, it will be apparent that the present invention brings to the art a new and improved sensor 10 having unique provisions for temperature compensation and for preventing the lead wires 46 from causing thermal and mechanical stress in the coil 44. By virtue of soldering the end portions 51 and the lead wires spaced apart on the palladium silver strips, electrical continuity is established between the coil and the lead wires while protecting the fragile end portions of the coil. Accordingly, the sensor is adapted for operation in a relatively high temperature, high vibration environment. Further, the sensor 10 is especially suitable for use with magnetic bearings as a result of its enhanced reliability over prior sensors.

I claim:

1. A shaft position sensor having a sensing end adapted to be aimed at and positioned closely with respect to a rotating shaft for accurately measuring the position of the shaft, the shaft position sensor comprising, in combination:

a ceramic holder;

a magnetically permeable rod having a first end inserted in and fixed to a bobbin end of the ceramic holder;

an end cap mounted on the rod near a second end thereof and defining a length of the rod between the end cap and the ceramic holder for supporting a coil;

a wire coil wound on said length of the rod between the end cap and the ceramic holder;

the ceramic holder carrying two conductive surfaces positioned on an outer surface thereof and running generally from the bobbin end toward a base end of the holder which is opposite the bobbin end;

the coil having two free wire end portions formed into strain relief loops and soldered to respective ones of the conductive surfaces near the bobbin end;

a pair of lead wires of sufficient diameter to withstand mechanical handling and having ends soldered to the conductive surfaces near the base end, the lead wire ends being out of direct physical contact with the coil wire ends but being electrically connected to the coil wire through the conductive surfaces; and means for supporting the shaft position sensor in a fixed position proximate to and aimed at the shaft for sensing the position thereof.

2. A position sensor as recited in claim 1 further comprising a protective cover over the coil and the solder connections, in which the holder includes two longitudinally running recesses, and wherein one conductive surface is defined in each recess, said recesses being adequately deep to receive the coil ends and the lead wires, the coil ends and lead wires being generally trapped in the recesses by the protective cover.

3. A position sensor as recited in claim 2 in which the end cap and the protective cover are formed from ceramic.

4. A position sensor as recited in claim 2 in which the end cap and the protective cover are made from ceramic, the protective cover fitting closely over the end cap, and a gap between the protective cover and the end cap being sealed with a high-temperature ceramic-based adhesive.

5. A position sensor as recited in claim 2 in which the sensing end is less than 0.25" in diameter, the sensing end including the rod, the coil, and the protective cover.

6. A position sensor as recited in claim 5 in which the sensing end is less than 1.0" in length.

7. A position sensor as recited in claim 1 in which the coil is wound with braided wire.

8. A position sensor as recited in claim 7 in which the rod is made from ferrite, in which the coil is operable to produce an electromagnetic field and is wound in a configuration which produces a resistivity versus temperature characteristic which has a given linear negative slope over a specified temperature range, and in which the ferrite rod is of a type of material which is selected to have a permeability versus temperature characteristic which has a linear positive slope which generally compliments the given negative slope of the coil so that the electromagnetic field has a strength which is relatively constant over the specified temperature range.

9. A position sensor as recited in claim 1 wherein the shaft is supported by active magnetic bearings which are controlled by an associated electronic controller, and in which the coil is connected to provide a position feedback signal to the electronic controller.

10. A position sensor as recited in claim 1 in which each conductive surface is defined by a thin film of conductive material eutectically bonded to the outer surface of the ceramic holder.

11. A position sensor as recited in claim 10 in which the conductive material is palladium silver.

12. A position sensor as recited in claim 1 in which the coil is not potted, leaving spaces between the coiled wire so as to permit the wire to freely expand and contract as a result of temperature changes.

13. A position sensor as recited in claim 12 in which there is no potting material between the coil and the protective cover, so that the coil is free to expand and contract due to temperature changes, and in which there is no potting material between the protective cover and the strain relief loops formed in the coil end portions so that the wire loops are free to expand and contract as a result of changes in temperature and to accommodate expansion and contraction differences between the coil and the holder.

14. A shaft position sensor having a sensing end adapted to be aimed at and positioned closely with respect to a rotating shaft for accurately measuring the position of the shaft, the shaft position sensor comprising, in combination:

an insulating base having an outer periphery;

a magnetically permeable rod having a base end inserted in and fixed to the insulating base;

a wire coil wound on the length of the rod which is not inserted;

two conductive surfaces carried on an outer surface of the insulating base and running lengthwise along said insulating base, the conductive surfaces having first ends positioned near the coil and terminating in second ends disposed away from the coil;

the coil having two free wire end portions formed into strain relief loops and being attached to respective ones of the conductive surfaces near the coil to form electrical connections therewith;

a pair of lead wires of sufficient diameter to withstand mechanical handling, the lead wires each having an end soldered to one of the conductive surfaces out of direct physical contact with the coil wire end but being electrically connected to the coil wire through the conductive surfaces; and means supporting the base for mechanically mounting the shaft position sensor in a fixed position proximate to and aimed at the shaft for sensing the position thereof.

15. A position sensor as recited in claim 14 in which the rod is made from ferrite, in which the coil is operable to produce an electromagnetic field and is wound in a configuration which produces a resistivity versus temperature characteristic which has a given linear negative slope over a specified temperature range, and in which the ferrite rod is of a type of material which is selected to have a permeability verses temperature characteristic which has a linear positive slope which generally compliments the given negative slope of the coil so that the electromagnetic field has a strength which is relatively constant over the specified temperature range.

16. A position sensor as recited in claim 14 in which the base is formed from ceramic, and in which the conductive surfaces are defined by thin films of eutectically bonded material on the ceramic base.

\* \* \* \* \*